US012750802B2

(12) United States Patent
Chen et al.

(10) Patent No.: US 12,750,802 B2
(45) Date of Patent: Sep. 29, 2026

(54) METHOD AND APPARATUS FOR PROCESSING TRACKING AREA ANOMALY, COMMUNICATION DEVICE, AND STORAGE MEDIUM

(71) Applicant: Beijing Xiaomi Mobile Software Co., Ltd., Beijing (CN)

(72) Inventors: Dong Chen, Beijing (CN); Yang Shen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 315 days.

(21) Appl. No.: 18/580,916

(22) PCT Filed: Jul. 20, 2021

(86) PCT No.: PCT/CN2021/107292
§ 371 (c)(1),
(2) Date: Jan. 19, 2024

(87) PCT Pub. No.: WO2023/000161
PCT Pub. Date: Jan. 26, 2023

(65) Prior Publication Data
US 2024/0381285 A1 Nov. 14, 2024

(51) Int. Cl.
*H04W 60/00* (2009.01)
*H04W 4/02* (2018.01)
(Continued)

(52) U.S. Cl.
CPC ........... *H04W 60/04* (2013.01); *H04W 60/02* (2013.01); *H04W 64/00* (2013.01); *H04W 68/02* (2013.01)

(58) Field of Classification Search
CPC ..... H04W 60/04; H04W 60/00; H04W 4/029; H04W 64/00; H04W 64/006; H04W 4/02; H04W 48/18; H04W 76/27; H04W 8/08
See application file for complete search history.

(56) References Cited

U.S. PATENT DOCUMENTS

| | | | | |
|---|---|---|---|---|
| 2011/0069664 A1* | 3/2011 | Yin | ........................ | H04W 60/00 370/328 |
| 2012/0252451 A1* | 10/2012 | Knauft | .................... | H04W 8/06 455/436 |

(Continued)

FOREIGN PATENT DOCUMENTS

| | | |
|---|---|---|
| CN | 101170816 A | 4/2008 |
| CN | 101529971 A | 9/2009 |

(Continued)

OTHER PUBLICATIONS

Qualcomm Incorporated,"Discussion of Mobility Registration Update to support NR Satellite Access",SA WG2 Meeting #144e,S2-2102433,Apr. 12-16, 2021, e-Meeting.

(Continued)

*Primary Examiner* — Sai Aung
(74) *Attorney, Agent, or Firm* — Volpe Koenig

(57) ABSTRACT

A method, apparatus and computer readable medium for processing a tracking area anomaly in a wireless communication system. The tracking area anomaly is processed by: recording, in response to determining that the TA anomaly in which a TA where user equipment (UE) is currently positioned is located outside a registration area (RA) of the UE occurs, the TA anomaly. Then triggering an RA update for the UE in response to the TA anomaly.

18 Claims, 9 Drawing Sheets

(51) Int. Cl.

| | |
|---|---|
| ***H04W 4/029*** | (2018.01) |
| ***H04W 60/02*** | (2009.01) |
| ***H04W 60/04*** | (2009.01) |
| ***H04W 64/00*** | (2009.01) |
| ***H04W 68/02*** | (2009.01) |

(56) References Cited

U.S. PATENT DOCUMENTS

| | | | | |
|---|---|---|---|---|
| 2015/0163639 | A1* | 6/2015 | Kilpatrick, II | H04W 60/04 455/456.1 |
| 2015/0289110 | A1* | 10/2015 | Kilpatrick, II | H04W 60/04 455/456.1 |
| 2016/0105765 | A1* | 4/2016 | Farley | H04W 4/029 455/456.1 |
| 2016/0261979 | A1* | 9/2016 | Vaccari | H04W 64/006 |
| 2019/0021064 | A1 | 1/2019 | Ryu et al. | |
| 2019/0116529 | A1* | 4/2019 | Lu | H04W 8/16 |
| 2019/0335414 | A1* | 10/2019 | Rasanen | H04W 64/00 |
| 2019/0373441 | A1* | 12/2019 | Ryu | H04W 48/18 |
| 2025/0212158 | A1* | 6/2025 | Suh | H04W 76/20 |

FOREIGN PATENT DOCUMENTS

| | | | |
|---|---|---|---|
| CN | 109155909 | A | 1/2019 |
| EP | 3402234 | A1 | 11/2018 |

OTHER PUBLICATIONS

Qualcomm Incorporated,"Discussion of Mobility Registration Update to support NR Satellite Access",SA WG2 Meeting #144e,S2-2102433,Apr. 12-16, 2021, e-Meeting(rev marked).

Intel Corporation and etc. "Enhanced procedure for non-EPS services recovery during periodic TAU", 3GPP TSG-CT WG1 Meeting #86 C1-140166, Jan. 24, 2014.

3GPP TS 23.501, V17.1.0 (Jun. 2021).

3GPP TS 23.502, V17.1.0 (Jun. 2021).

* cited by examiner

METHOD AND APPARATUS FOR PROCESSING TRACKING AREA ANOMALY, COMMUNICATION DEVICE, AND STORAGE MEDIUM

CROSS REFERENCE TO RELATED APPLICATION

The present application is a U.S. National Stage of International Application No. PCT/CN2021/107292, filed on PCT Jul. 20, 2021, the contents of all of which are incorporated herein by reference in its entirety for all purposes.

TECHNICAL FIELD

The disclosure relates to, but is not limited to, the technical field of radio communication, and in particular to a method and apparatus for processing a tracking area (TA) anomaly, a communication device, and a storage medium.

BACKGROUND

When initially being connected to a network, user equipment (UE) sends a registration request to the network, and a network side makes a response to the registration request. In a registration process, the network side records a registration area (RA) of the UE, which typically encompasses one or more tracking areas (TAs). The network side records the RA of the UE in the form of a TA list (TAL) in some cases.

SUMMARY

A method and apparatus for processing a tracking area (TA) anomaly, a communication device, and a storage medium are provided in examples of the disclosure.

In a first aspect, a method for processing a TA anomaly is provided in an example of the disclosure. The method is executed by a network device and includes recording, in response to determining that the TA anomaly that a TA where UE is currently positioned is located outside a registration area (RA) of the UE occurs, the TA anomaly, and triggering an RA update of the UE in response to the TA anomaly.

In a second aspect, a method for processing a TA anomaly is provided in an example of the disclosure. The method is executed by a user equipment (UE) and includes: receiving a triggering indication sent by a network side based on the TA anomaly of the UE, wherein the TA anomaly comprises: a TA where the UE is currently positioned is located outside an RA of the UE; and performing an RA update according to the triggering indication.

In a third aspect, an apparatus for processing a TA anomaly is provided in an example of the disclosure. The apparatus includes: a recording module configured to record, in response to determining that the TA anomaly that a TA where UE is currently positioned is located outside an RA of the UE occurs, the TA anomaly; and a triggering module configured to trigger an RA update of the UE in response to the TA anomaly.

In a fourth aspect, an apparatus for processing a TA anomaly is provided in an example of the disclosure. The apparatus includes: a reception module configured to receive a triggering indication sent by a network side based on the TA anomaly of the UE, wherein the TA anomaly comprises: a TA where the UE is currently positioned is located outside an RA of the UE; and an update module configured to perform an RA update according to the triggering indication.

In a fifth aspect, a communication device is provided in an example of the disclosure. The communication device includes a processor, a transceiver, a memory, and an executable program stored in the memory and runnable by the processor, where the processor executes the method for processing a TA anomaly in the first foregoing aspect when running the executable program.

In a sixth aspect, a computer storage medium is provided in an example of the disclosure. The computer storage medium stores an executable instruction, where the executable instruction implements the method for processing a TA anomaly in the first foregoing aspect when executed by a processor.

It should be understood that the above general description and the following detailed description are merely illustrative and explanatory and cannot limit the examples of the disclosure.

BRIEF DESCRIPTION OF THE DRAWINGS

The accompanying drawings are incorporated in the description as a constituent part of the description here, illustrate examples conforming to the disclosure, and serve to explain the principles of the examples of the disclosure along with the description.

DETAILED DESCRIPTION

Examples will be described in detail here and are illustratively shown in the accompanying drawings. When the following description relates to the accompanying drawings, the same numbers in different accompanying drawings denote the same or similar elements unless otherwise indicated. The embodiments described in the following examples do not denote all embodiments consistent with the examples of the disclosure. On the contrary, they are merely instances of apparatuses and methods consistent with some aspects of the examples of the disclosure, as recited in the appended claims.

The terms used in the examples of the disclosure are merely to describe the specific examples, instead of limiting the examples of the disclosure. The singular forms such as "a," "an," and "this" used in the examples of the disclosure and the appended claims are also intended to include the plural forms, unless otherwise clearly stated in the context. It should also be understood that the term "and/or" used here means and encompasses one or any or all possible combinations of a plurality of associated items listed.

It should be understood that although the terms first, second, third, etc. may be employed in the examples of the disclosure to describe various information, these pieces of information should not be limited to this. These terms are merely used to distinguish between the same type of information. For example, first information can also be referred to as second information, and similarly, second information can also be referred to as first information, without departing from the scope of the examples of the disclosure. The word "if," as used here, can be interpreted as "at the time of," "when," or "in response to determining," depending on the context.

As a radio cell or the UE moves, the UE may enter a new TA. However, the new TA is not encompassed in the TAL corresponding to the RA, and the UE does not sense that the UE has entered the new TA. Consequently, a registration update process for updating the TA will not be initiated, leading to a TA anomaly.

Figure 1:
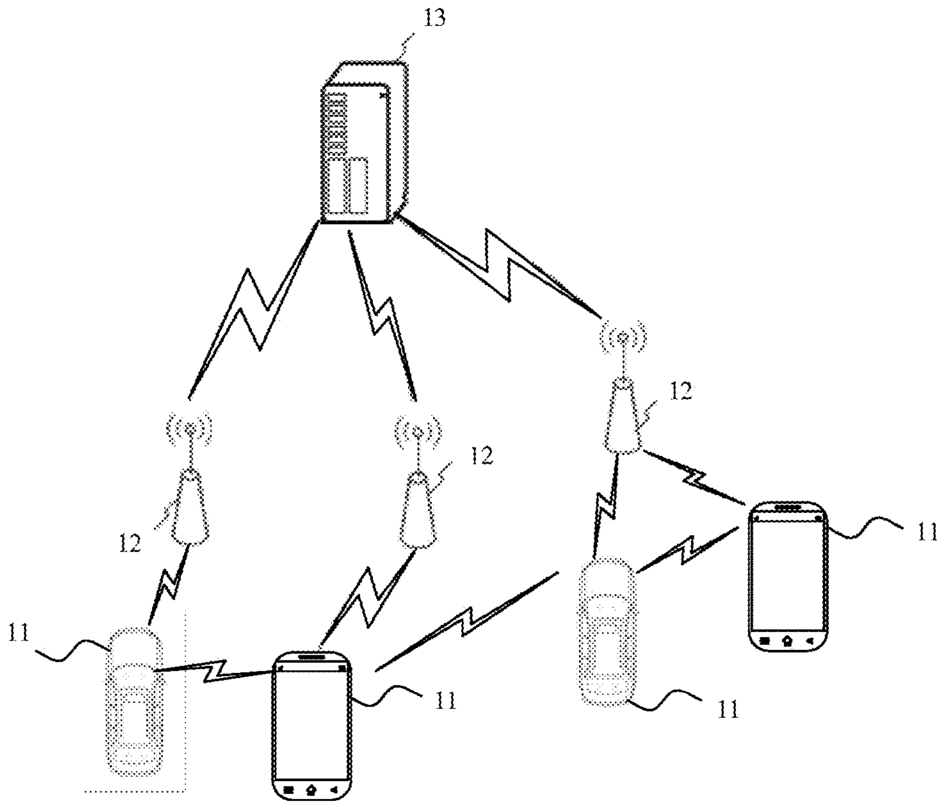
FIG. 1 is a schematic structural diagram of a radio communication system shown according to an example.

With reference to FIG. 1, a schematic structural diagram of a radio communication system according to an example of the disclosure is shown. As shown in FIG. 1, the radio communication system is a communication system based on a cellular mobile communication and may include several pieces of user equipment 11 and several access devices 12.

The user equipment 11 may be a device providing voice and/or data connectivity for a user. The UE 11 may communicate with one or more core networks via a radio access network (RAN). The UE 11 may be Internet of Things user equipment, such as a sensor device, a mobile phone (or referred to as a "cellular" phone), and a computer with Internet of Things user equipment, for example, a stationary, portable, pocket, handheld, intra-computer, or vehicle-mounted apparatus. For example, the UE 11 may be a station (STA), a subscriber unit, a subscriber station, a mobile station, a mobile, a remote station, an access point, a remote terminal, an access terminal, a user terminal, a user agent, a user device, or user equipment (UE). Alternatively, the UE 11 may also be an unmanned aerial vehicle. Alternatively, the UE 11 may also be a vehicle-mounted device, for example, an electronic control unit having a radio communication function, or a radio communication device externally connected to the electronic control unit. Alternatively, the UE 11 may also be a roadside device, for example, a streetlamp, a signal lamp, etc., having a radio communication function.

The access device 12 may be a network-side device in the radio communication system. The radio communication system may be a 4th generation mobile communication (4G) system, which is also called a long-term evolution (LTE) system. Alternatively, the radio communication system may also be a 5th generation mobile communication (5G) system, which is also called a new radio (NR) system or a 5G NR system. Alternatively, the radio communication system may also be a next-generation system following the 5G system. An access network in the 5G system may be called a new generation radio access network (NG-RAN), or a machine-type communication (MTC) system.

The access device 12 may be an evolved access device employed in the 4G system, such as an eNB (evolved node B). Alternatively, the access device 12 may also be an access device employing a central-distributed architecture in the 5G system, such as a gNB (generation node B). When employing the central-distributed architecture, the access device 12 typically includes a central unit (CU) and at least two distributed units (DUs). The central unit is provided with a protocol stack of a packet data convergence protocol (PDCP) layer, a radio link control (RLC) layer, and a media access control (MAC) layer. The distributed unit is provided with a protocol stack of a physical (PHY) layer. Particular embodiments of the access device 12 are not limited in the examples of the disclosure.

A radio connection may be established between the access device 12 and the UE 11 through a wireless radio. In different embodiments, the wireless radio is a wireless radio based on a standard of the 4th generation mobile communication (4G) or a standard of the 5th generation mobile communication (5G), and is a new radio, for example. Alternatively, the wireless radio may also be a wireless radio based on a standard of a next generation mobile communication following 5G.

In some examples, an end to end (E2E) connection may also be constructed between the UE 11. For example, scenarios such as vehicle to vehicle (V2V) communication, vehicle to infrastructure (V2I) communication, and vehicle to pedestrian (V2P) communication in vehicle to everything (V2X) communication are provided.

In some examples, the radio communication system above may further encompass a network management device 13.

Several access devices 12 are individually connected to the network management device 13. The network management device 13 may be a core network device in the radio communication system. For example, the network management device 13 may be a mobility management entity (MME) in an evolved packet core (EPC). Alternatively, the network management device may also be another core network device, such as a serving gateway (SGW), a public data network gateway (PGW), a policy and charging rules function (PCRF), or a home subscriber server (HSS). An implementation form of the network management device 13 is not limited in the examples of the disclosure.

Figure 2:
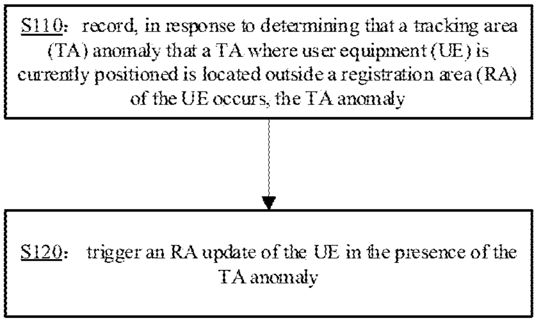
FIG. 2 is a schematic flowchart of a method for processing a tracking area (TA) anomaly, shown according to an example.

As shown in FIG. 2, a method for processing a tracking area (TA) anomaly is provided in an example of the disclosure. The method is executed by a network device and includes steps S110 and S120.

S110: in response to determining that the TA anomaly that a TA where the user equipment (UE) is currently positioned is located outside a registration area (RA) of the UE occurs, the TA anomaly is recorded.

S120: an RA update of the UE is triggered in response to the TA anomaly.

The network device here includes, but is not limited to, a core network device. The core network device includes, but is not limited to, an access management function (AMF).

The UE may have the RA recorded on a network side at the previous registration. The RA includes a tracking area code (TAC) of one or more TAs. If the UE changes a location and enters a new TA, the TA where the UE is currently positioned is located outside the TAs in the RA, but the UE does not initiate a registration update procedure realizing the RA update. Thus, it is determined that the TA anomaly occurs. Illustratively, unified data management (UDM) or the AMF on the network side possesses a record of the RA of the UE. Illustratively, in a previous registration process of the UE, the UE and/or the UDM and the AMF of the network device possess a record of the RA of the UE.

After determining that such a TA anomaly occurs, the network side records the TA anomaly. Illustratively, the network device, such as the AMF, records such a TA anomaly state and forms state information of a TA anomaly state.

In some examples, the UE sends a non-access stratum (NAS) request message. After receiving the NAS request message, an access network device (for example, a base station) enables location information (encompassing the TA where the UE is currently positioned) of the UE to be encompassed in the NAS request message and sends a resulting NAS request message to the core network device (for example, the AMF). If finding that the TA where the UE is positioned is not located within the TAs encompassed in the RA recorded by the network side, the core network device determines the TA anomaly. When the UE performs a service request or requests to construct a protocol data unit (PDU) session, the core network device receives the NAS request message and enters a NAS processing flow to respond to the NAS request message after receiving the NAS request message.

The NAS request message includes, but is not limited to, at least one of the following a protocol data unit (PDU) session establishment request message and/or a service request message.

A variety of causes may lead to TA abnormalities, and one possible cause is provided below.

If the UE has accessed a cell (for example, a cell accessed through a satellite) and moves to a new TA, but the new TA is not encompassed within the TAs encompassed in the RA registered by the UE, the TA anomaly is generated. If finding that it has entered the new TA, the UE actively triggers the registration update procedure. If the UE does not sense that it has entered the new TA, the UE may not actively initiate the registration update procedure, so as to directly reach the network side. The network side device finds such a TA anomaly of the UE.

Figure 4:
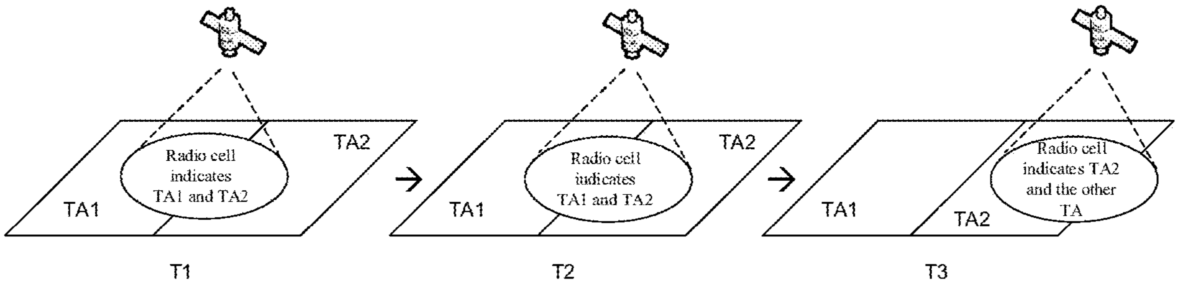
FIG. 4 is a schematic diagram of another TA handover of a radio cell, shown according to an example.

As shown in FIG. 4, at time T1, the UE is positioned in TA1 and accesses a 5G core network through the satellite. The satellite broadcasts a plurality of TAs (TA1 and TA2) to the UE. The UE completes access registration. The network side generates the RA (including TA1 and other TAs, but excluding TA2) for the UE. At time T2, the UE moves into TA2. Since the TA broadcast by the satellite to the UE is the same at T1 and T2, the UE does not sense that the TA update has been generated. Thus, the UE does not actively initiate a registration update realizing the RA update. If the UE initiates a service request at time T2, the gNB reports TA2, where the UE is currently positioned, to the network side. The network side finds that TA2, where the UE is currently positioned, is not encompassed in the RA of the UE, leading to the TA anomaly of the UE. Certainly, what is described above is merely a simple example of the causes leading to the TA abnormalities of the UE. Various methods are possible during particular implementation, which is not limited to the above example.

Figure 3:
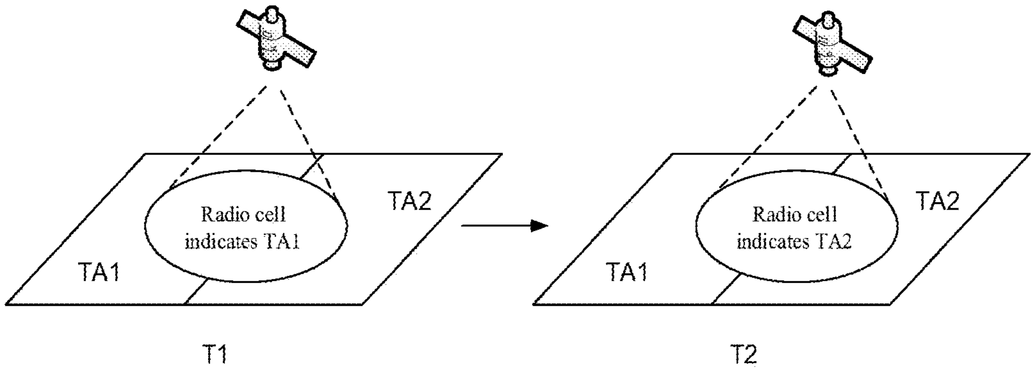
FIG. 3 is a schematic diagram of a TA handover of a radio cell, shown according to an example.

With reference to FIGS. 3 and 4, the satellite may be connected to the 5G core network (CN). The radio cell may broadcast one or more TACs for one public land mobile network (PLMN), and the UE determines its own TA according to this information broadcast.

In one case, the radio cell broadcasts one TAC, and the UE takes the TA as the TA where the UE is currently positioned.

As shown in FIG. 3, assuming that at time T1, the satellite and the radio cell are positioned at position 1 and mostly covering TA1, and the TAC possibly broadcast may be a TAC of TA1. If the satellite and the radio cell move, for example, from left to right as shown in FIG. 3, the radio cell may cover two TAs (i.e., TA1 and TA2) simultaneously at a certain time, or may be gradually switched from covering TA1 to not covering TA1 but completely covering TA2. At time T2, when the satellite and the radio cell move into TA2, the TA where a current radio cell is positioned is deemed as TA2, and a TAC of TA2 may be broadcast to the UE.

In another case, the radio cell may broadcast a plurality of TACs at a time. With reference to FIG. 4, from time T1 to time TA2, since the radio cell simultaneously covers TA1 and TA2, the satellite and the radio cell simultaneously broadcast the TACs of TA1 and TA2 to the UE. At time T3, the satellite and the radio cell move to cover TA2 and other TAs on the right of TA2 and broadcast TACs of TA2 and other TAs to the UE.

In either of the above cases, the AMF pages the UE according to the TAC encompassed in the RA of the UE. If an access network (AN) or the radio access network (RAN) may determine the TA where the UE is currently positioned from the RA, the UE is paged within this TA.

The UE initiates a registration update. When the TA where the UE is currently positioned is not encompassed in the RA of the UE, the network device of the core network, such as the AMF, updates the RA of the UE in the registration update procedure. An updated TA includes the TA where the UE is currently positioned and the TA that the UE may access. In this way, the UE can be successfully paged in a later stage.

Illustratively, as shown in FIG. 4, if at time T1, the UE is positioned in TA1 and accesses the 5G network through the satellite, the satellite and the radio cell broadcast TA1 and TA2 to the UE. The UE determines the TA where the UE is positioned according to broadcast information and completes registration. The AMF generates the RA (including TA1 and other TAs, but excluding TA2) for the UE, which serves as a part of the registration process. At time T2, the UE moves from TA1 to TA2. Since the satellite and the radio cell continuously broadcast TA1 and TA2 to the UE at times T1 and T2, the UE may fail to sense a change in the TA where the UE is positioned and does not trigger the registration update realizing the RA update. However, at time T2, if the UE initiates a service request process, the gNB reports TA2 (acquired by the gNB through measurement) where the UE is currently positioned to the AMF. The AMF determines that TA2, where the UE is currently positioned, is not encompassed within the RA of the UE. In this case, the AMF may determine that the foregoing TA anomaly of the UE occurs.

After receiving the NAS request message sent by the UE, the base station enables the location information (encompassing the TA where the UE is currently positioned) of the UE to be encompassed in the NAS request message. Illustratively, the TA where the UE is currently positioned, encompassed in the NAS request message, may be used as part of user location information (ULI) in a next-generation application protocol (NGAP). If the TA indicated by the ULI is not encompassed in the RA of the UE, a TA anomaly unknown to the UE may occur.

When the TA anomaly exists, the UE is triggered to perform the RA update. Illustratively, a triggering indication is sent to the UE. The triggering indication may be configured to instruct the UE to perform the registration update procedure. In this way, the UE updates the RA through the registration update procedure. Such a TA anomaly can be removed through the RA update that encompasses the TA where the UE is currently positioned.

The network device issues the triggering indication of the registration update procedure based on the TA anomaly. The triggering indication is configured to indicate the cause why the UE initiates the registration update procedure.

Figure 5:
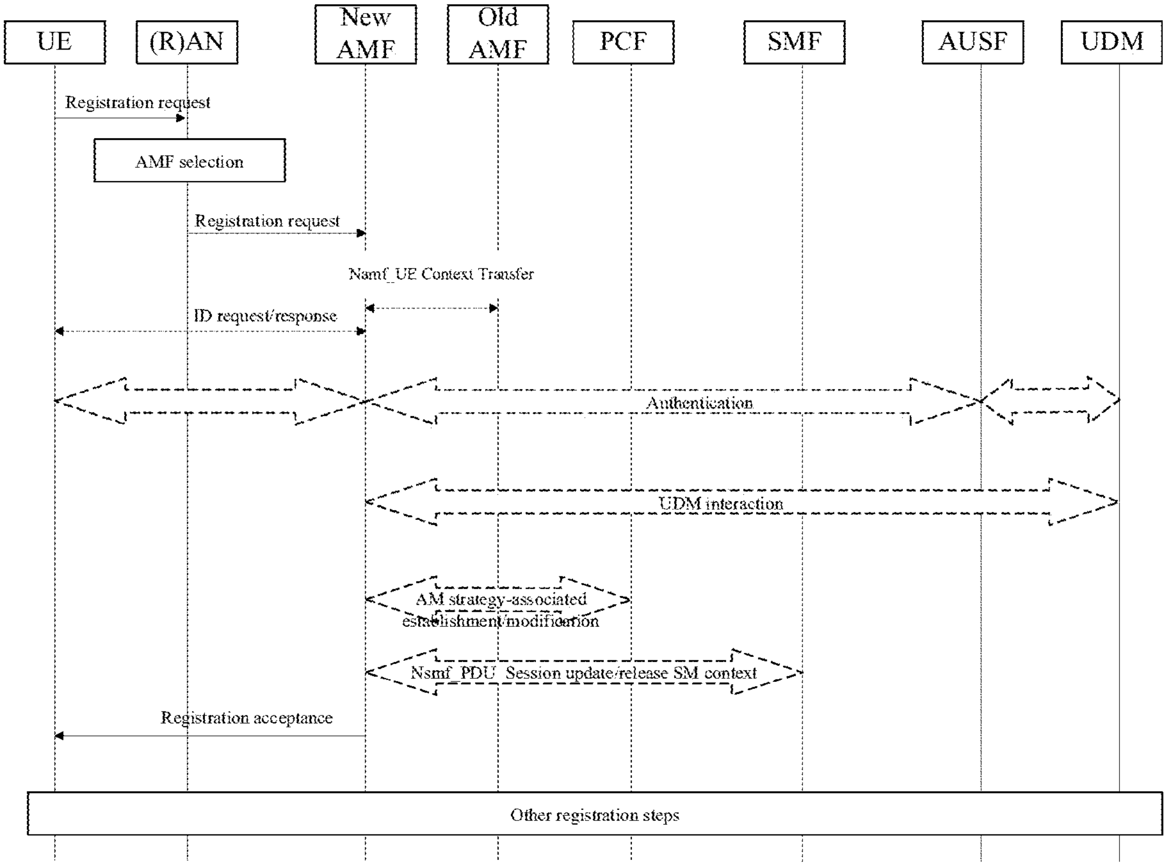
FIG. 5 is a schematic flowchart of a method for processing a TA anomaly, shown according to an example.

Illustratively, FIG. 5 shows a registration flow as follows.

The access network (AN) or the RAN receives a registration request of the UE, where the registration request includes: an AN parameter, a registration type, a subscription permanent identifier (SUPI), or a globally unique temporary UE identity (GUTI) of the fifth mobile communication (5G), a permanent equipment identifier (PEI), a requested single network slice selection assistance information (NSSAI), a last accessed and available tracking area identity (TA1), etc. The registration type indicates initialization registration, a mobile registration update, a periodic registration update, or permanent registration that the UE may be required to perform. The last accessed TA1 may be configured to assist in determining the RA of the UE by the network device, such as the AMF.

After receiving the registration request, the AN or the RAN selects the AMF for the UE. Illustratively, the AN or the RAN selects the AMF for the UE according to information such as a radio access technology (RAT) used for transferring the registration request and the requested NSSAI. If the RAN fails to select one suitable AMF for the UE, the AMF configured in the RAN or the AN is sent to an RAN registration message, i.e., the AMF configured in the RAN or the AN is selected as the AMF of the UE.

The registration request is sent to the AMF selected. The RAN or the AN enables the registration request to be carried in an N2 message, so as to send the registration request to the AMF selected. An N2 parameter of the N2 message may include, but is not limited to, a registration request, an identity (ID) of a public land mobile network (PLMN) selected, location information, and a cell ID of a cell where the UE is positioned, etc.

If a serving AMF of the UE changes relative to the AMF selected for previous registration, a new AMF acquires the SUPI of the UE and a context of the UE from an old AMF.

If the UE does not provide a subscription concealed identifier (SUCI) or the old AMF does not provide an SUCI, the new AMF initiates an ID request flow to obtain the SUCI.

The new AMF determines that UE authentication involving an authentication server function (AUSF) is initiated for the UE. For example, the new AMF selects one AUSF based on the SUPI or the SUCI of the UE.

If the AMF of the UE is switched relative to the previous registration flow, or the SUPI provided by the UE does not relate to an effective context in the AMF, the AMF selects and registers with a unified data management (UDM) based on the SUPI. If the AMF does not acquire subscription data of the UE, the subscription data of the UE is acquired from the UDM.

The new AMF interacts with a point coordination function (PCF) for a flow for constructing or modifying an access and mobility management (AM) policy.

If a PDU session encompassing the registration request is activated, the AMF sends an Nssmf_PDU Session_Update SM Context request to a session management function (SMF) associated with the PDU session, so as to activate user plane connectivity for the PDU session.

The new AMF sends a registration acceptance message to the UE, indicating that the registration request is accepted. The registration acceptance message includes the RA, mobility restriction, NASSAI allowed to be used, periodic registration timer indication, etc. If a new RA is allocated by the AMF, information about the new RA is sent to the UE. If no new RAis allocated to the UE, no information about the RA is carried in the registration acceptance message, indicating that an old RA is still effective.

The remaining steps of the registration flow will not be described in sequence here.

In some examples, S120 may include whether the TA anomaly exists is periodically determined. If yes, the UE is triggered to perform the RA update based on an existing TA anomaly.

In some other examples, S120 may include whether the TA anomaly exists is determined before a service flow or a control flow associated with the RA of the UE, or the TA where the UE is positioned is executed.

Illustratively, the method may further include: firstly, whether the TA anomaly exists is determined when paging the UE. In this way, S120 may include: the UE is triggered to perform the RA update in response to determining that the TA anomaly of the UE exists when paging the UE. After the UE completes the RA update, the TA anomaly of the UE is removed. In this way, the UE may be paged according to the TA where the UE is positioned, so that a paging failure phenomenon caused by the TA anomaly of the UE is suppressed.

Figure 6:
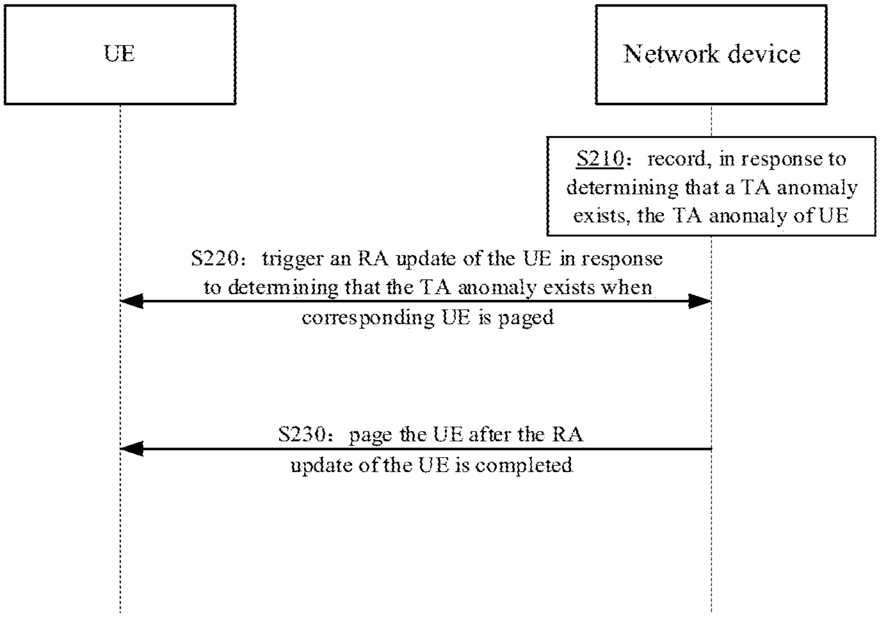
FIG. 6 is a schematic flowchart of a method for processing a TA anomaly, shown according to an example.

As shown in FIG. 6, a method for processing a TA anomaly is provided in an example of the disclosure. The method may include steps S210-S230.

S210: in response to determining that a TA anomaly exists, the TA anomaly of the UE is recorded.

S220: an RA update of the UE is triggered in response to determining that the TA anomaly exists when the corresponding UE is paged.

S230: the UE is paged after the RA update of the UE is completed.

If the TA anomaly exists in the UE, the TA anomaly is recorded at the network side, for example, in the AMF. Before determining to page the UE, the AMF first queries whether the TA anomaly exists in the UE to be paged. If yes, the TA anomaly is required to be removed first. The TA anomaly may be removed by triggering the RA update of the UE. For example, the RA update of the UE triggered by the network side may include: a triggering indication is sent to the UE, so as to instruct the UE to initiate a registration update procedure. After receiving the triggering indication, the UE sends a registration update request to the network side. Through the execution of the registration update procedure, the RA of the UE encompasses the TA where the UE is positioned, so as to remove such a TA anomaly.

Figure 7:
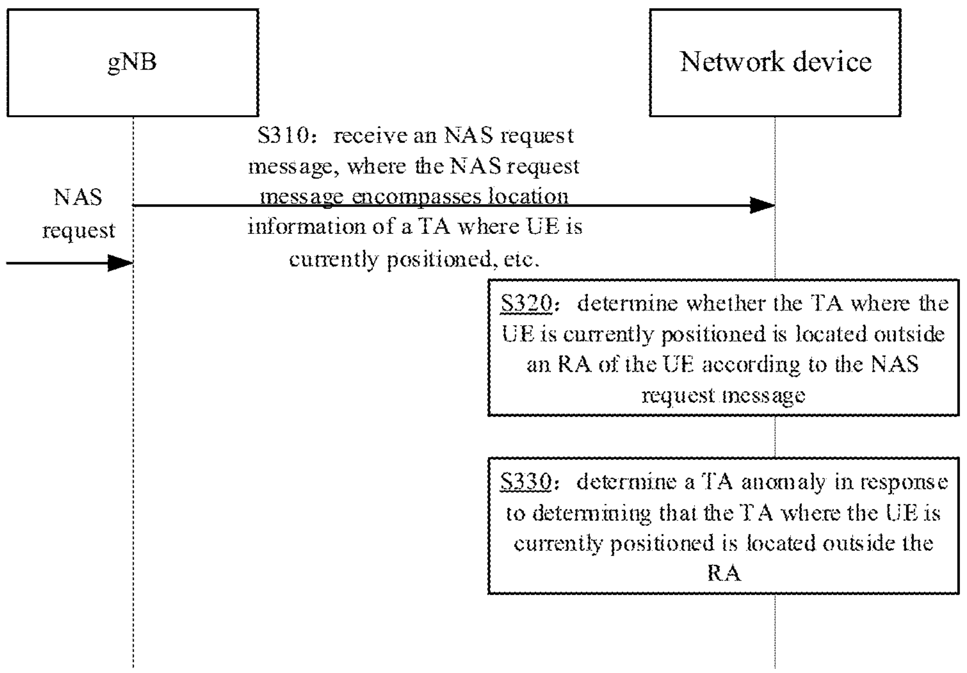
FIG. 7 is a schematic flowchart of a method for processing a TA anomaly, shown according to an example.

As shown in FIG. 7, a method for processing a TA anomaly is provided in an example of the disclosure. The method is executed by a network device and may include steps S310-S330.

S310: a NAS request message is received, where the NAS request message encompasses location information of a TA where the UE is currently positioned, etc.

S320: whether the TA where the UE is currently positioned is located outside an RA of the UE is determined according to the NAS request message.

S330: the TA anomaly is determined in response to determining that the TA where the UE is currently positioned is located outside the RA.

The network device may be a network device of a core network, such as an AMF.

After receiving the NAS request message sent by the UE, a base station enables location information (encompassing the TA where the UE is currently positioned) of the UE to be encompassed in the NAS request message and sends a resulting NAS request message to a core network device (for example, the AMF). If finding that the TA where the UE is positioned is not located within the TAs encompassed in the RA recorded by the network side, the core network device determines the TA anomaly. For example, the base station adds the TA where the UE is currently positioned to the user location information (ULI) of the UE encompassed in the NAS request message of the UE.

The method, according to the example of the disclosure, may be executed alone or may be a specific implementation of the foregoing S110.

In conclusion, in the example of the disclosure, the network device may determine whether the TA anomaly exists in the UE according to the NAS request message.

In the example of the disclosure, the method further includes a response is made to the NAS request message as usual when the TA anomaly is determined. The step that a response is made to the NAS request message, as usual here, may be as if the TA anomaly does not exist, a subsequent step of a NAS flow triggered by the NAS request message is continued executing.

In some examples, the method further includes a registration update request initiated by the UE is received in response to a record of the TA anomaly existing and a record of the TA anomaly is removed after the RA update corresponding to the registration update request is completed.

Except for the condition that the network side triggers the UE to initiate the registration update procedure (i.e., one type of registration flow), the UE may also actively initiate the registration update procedure.

Illustratively, if the UE initiates the registration update procedure after moving into a new TA, the RA of the UE recorded by the network side is updated.

Further illustratively, the UE may also change network parameters negotiated with the network side in a previous registration flow according to the registration update procedure.

Further illustratively, if the UE is configured with a periodic registration update, when an update time of the periodic registration update is reached currently, the UE also actively initiates the registration update procedure, so as to realize the registration update.

In the example of the disclosure, when being found, the TA anomaly of the UE is recorded. If the registration update request initiated by the UE actively or the registration update request initiated through triggering by the network side is received before the TA anomaly recorded is removed, execution of the registration flow is monitored. The record of such a TA anomaly is removed after the RA recorded by the UE and/or the network side is updated in a registration flow execution process corresponding to the registration update request. If the record of the TA anomaly of the UE is removed, when the TA anomaly of the UE is queried in S120, it is found that no TA anomaly exists in the UE.

Illustratively, the registration update request includes: the registration update request initiated when the UE receives the triggering of the TA anomaly; alternatively, a registration update request triggered by location movement of the UE; and alternatively, a periodic registration update request initiated by the UE.

In some examples, the network device includes the AMF.

Figure 8:
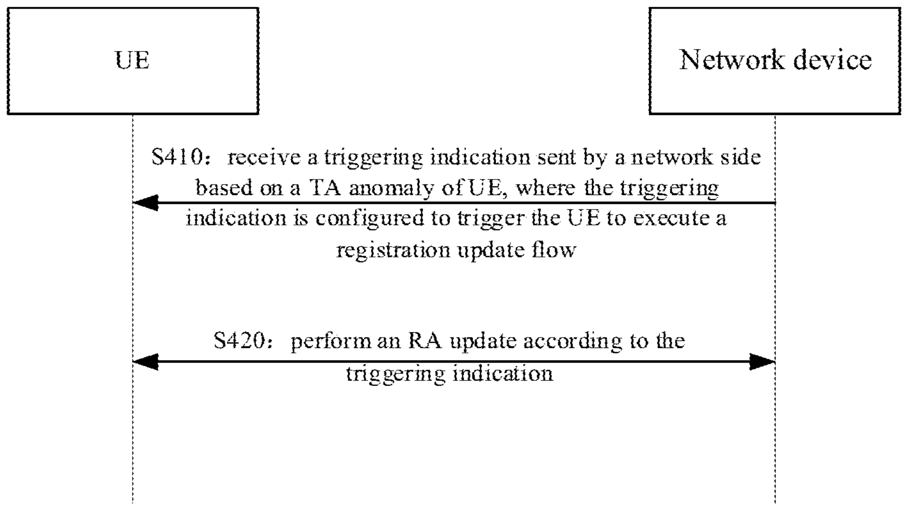
FIG. 8 is a schematic flowchart of a method for processing a TA anomaly, shown according to an example.

As shown in FIG. 8, a method for processing a TA anomaly is provided in an example of the disclosure. The method is executed by UE and includes S410 and S420.

S410: a triggering indication sent by a network side based on a TA anomaly of the UE, where the triggering indication is configured to trigger the UE to execute a registration update procedure. S420: an RA update is performed according to the triggering indication.

In the example of the disclosure, the network side includes, but is not limited to, a core network side.

The TA anomaly here includes: a condition that a TA where the UE is currently positioned is located outside an RA of the UE. The TA anomaly is determined by the network side.

If finding that the TA anomaly of the UE, the network side actively triggers the UE to perform the RA update. The network side issues the triggering indication. The triggering indication may be any indication issued by the network side for triggering the UE to initiate a registration update request. Illustratively, the triggering indication includes, but is not limited to, a configuration update instruction.

In some examples, the method further includes a NAS request message is sent, where the NAS request message, after being added with the location information of the UE at the time of passing through an access network device, is configured for a core network to determine whether the TA anomaly of the UE occurs.

For example, ULI is carried in the NAS request message. The ULI encompasses location information of the TA where the UE is positioned, etc. After receiving the NAS request message, if it is found that the TA encompassed in the NAS request message is not encompassed in the RA of the UE, the network side deems that the TA anomaly of the UE occurs. Such a TA anomaly is recorded if occurring.

Before executing a service flow or control flow associated with the RA of the UE or the TA where the UE is positioned, the network side queries whether the TA anomaly of the UE exists. If yes, the UE receives the triggering indication sent by the network side for a registration update.

The UE may initiate a registration update request according to such a triggering indication and update the RA of the UE and/or the network side through a registration update procedure corresponding to the registration update request, so as to remove such a TA anomaly.

In some examples, the triggering indication is received before the UE is paged. The triggering indication is received before the UE is paged, which is equivalent to the removal of the TA anomaly through the RA update. Thus, a UE paging success rate is ensured.

In order to solve the TA anomaly of the UE, if the TA anomaly of the UE is detected, the AMF records such a TA anomaly while neglecting the TA anomaly detected. After that, if a UE paging flow occurs, the AMF triggers the UE to initiate the registration update, so as to resolve the TA anomaly. After the TA anomaly is removed, the UE is repaged.

In this way, through such a method, no negative impact is generated on UE paging while the TA anomaly of the UE can be solved.

Illustratively, when the AMF receives the NAS request message (illustratively, the NAS request message includes, but is not limited to, a PDU establishment request message or a service request message), whether the TA anomaly occurs may be determined according to the NAS request message. If detecting such a TA anomaly, the AMF neglects the TA anomaly, records the TA anomaly in the AMF, and continues responding to the NAS request message, i.e., executes a NAS flow corresponding to the NAS request message as usual.

The AMF records the TA anomaly. After that, if the registration update initiated by the UE actively occurs owing to movement of the UE or the periodic registration update, and the TA anomaly is removed, the TA anomaly recorded is removed from the AMF; otherwise, a record of such a TA anomaly continues being stored in the AMF.

If the UE is required to be paged, the AMF determines whether the TA anomaly exists in the UE after receiving a paging message. If the TA anomaly of the UE is recorded in the AMF, the AMF triggers the UE to initiate the registration update procedure. After the registration update procedure is completed, the AMF sends the paging messages based on an updated RA. If no TA anomaly of the UE is recorded in the AMF, the AMF pages the UE according to a conventional flow.

Figure 9:
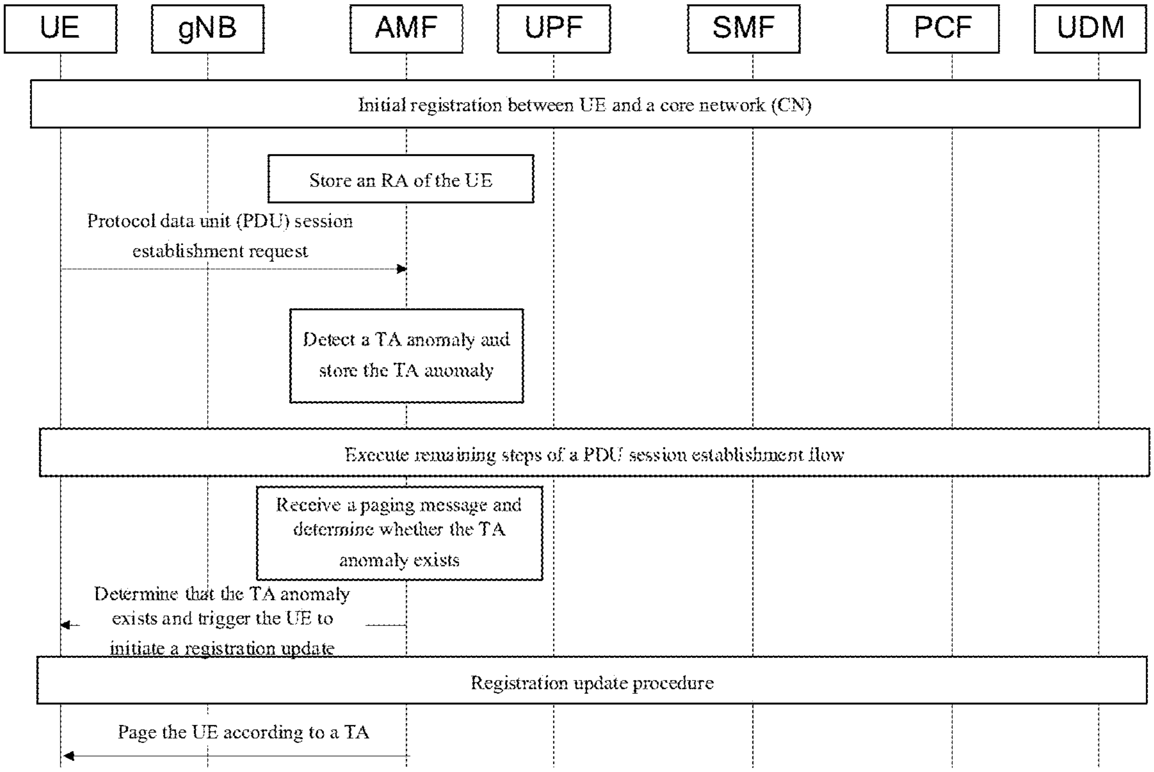
FIG. 9 is a schematic flowchart of a method for processing a TA anomaly, shown according to an example.

As shown in FIG. 9, when accessing a network, the UE initiates a registration flow. The registration flow is completed between the UE and a core network (CN). The registration flow initiated when the UE accesses the network is an initial registration flow between the UE and the CN (for example, a 5G CN).

If the initial registration succeeds, an RA of the UE is stored in an AMF. The RA may include one or more TAs.

A NAS request message (a PDU session establishment request message) is received. The NAS request message carries information through which a base station indicates a TA where the UE is positioned.

After receiving the NAS request message, the AMF detects whether a TA anomaly occurs. If the TA anomaly occurs, the AMF neglects such a TA anomaly and stores the TA anomaly of the UE.

The AMF and other entities continue to perform a PDU session establishment flow.

After a PDU session is constructed, the AMF sends a paging message to the UE if an emergency service is required to start. Before sending the paging message, the AMF determines whether the TA anomaly of the UE exists.

If the TA anomaly exists, the AMF sends a message triggering a registration update procedure to the UE.

After receiving the message triggering the registration update procedure, the UE initiates the registration update procedure to the 5G CN. After the registration update procedure is completed, the RA of the UE encompasses the TA where the UE is positioned.

The AMF pages the UE through the updated RA, so as to start the emergency service.

Figure 10:
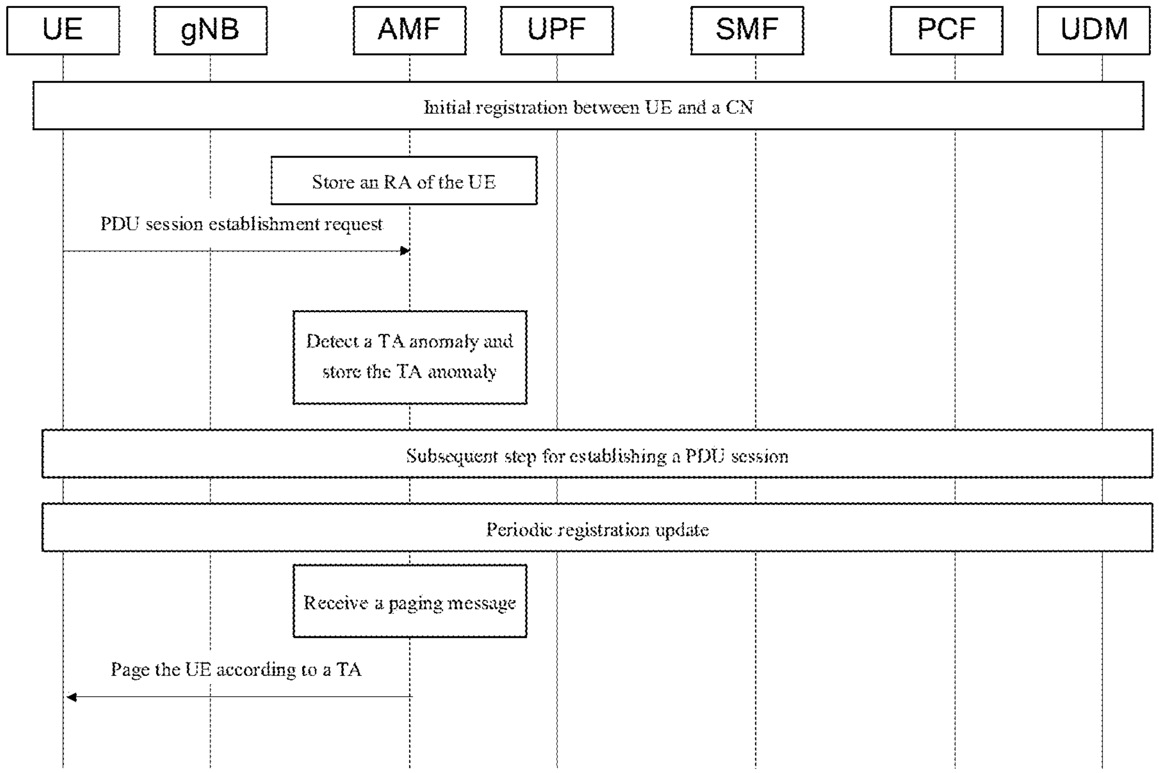
FIG. 10 is a schematic flowchart of a method for processing a TA anomaly, shown according to an example.

As shown in FIG. 10, when accessing a network, the UE initiates a registration flow. The registration flow is completed between the UE and a 5G core network (CN). Registration initiated when the UE accesses the network may be deemed as initial registration.

If the initial registration succeeds, an RA of the UE is stored in an AMF. The RA may include one or more TAs.

A NAS request message (a PDU session establishment request message) is received. The NAS request message carries information through which a base station indicates a TA where the UE is positioned.

After receiving the NAS request message, the AMF detects whether a TA anomaly occurs. If the TA anomaly occurs, the AMF neglects such a TA anomaly and stores the TA anomaly of the UE.

The AMF and other entities continue to perform a PDU session establishment flow.

After that, a periodic registration update procedure occurs. The AMF updates the RA of the UE. An updated RA encompasses the TA where the UE is currently positioned. After an update succeeds, the AMF removes the TA anomaly of the UE.

After a PDU session is constructed, if an emergency service is required to start, and the AMF determines that no TA anomaly of the UE exists, the AMF initiates paging to the UE based on the RA recorded, so as to start the emergency service.

In the example of the disclosure, when the NAS request message encompassing the TA indicating a current location of the UE is received, the TA anomaly of the UE is detected. If the TA anomaly occurs, the AMF neglects such a TA anomaly, records the TA anomaly, and continues performing a NAS flow of the NAS request message.

After this, if a registration update is initiated owing to the movement of the UE or a periodic registration update occurs, the TA anomaly of the UE is removed from the AMF. Otherwise, the TA anomaly continues to be stored in the AMF.

If the UE is paged, the AMF is required to determine whether the TA anomaly of the UE exists when receiving a paging message. If the TA anomaly of the UE exists, the AMF triggers the UE to initiate a registration update procedure based on the TA anomaly. After the registration update procedure is completed, the AMF sends the paging message based on the RA of the UE. If no TA anomaly of the UE exists in the AMF, the AMF pages the UE directly without triggering the UE to initiate a registration update.

Figure 11:
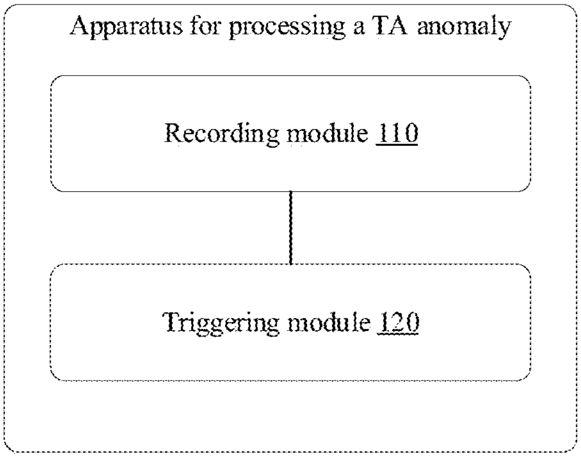
FIG. 11 is a schematic structural diagram of an apparatus for processing a TA anomaly, shown according to an example.

As shown in FIG. 11, an apparatus for processing a TA anomaly is provided in an example of the disclosure. The apparatus includes a recording module 110 and a triggering module 120.

The recording module 110 is configured to record, in response to determining that the TA anomaly that a TA where UE is currently positioned is located outside an RA of the UE occurs, the TA anomaly.

The triggering module 120 is configured to trigger an RA update of the UE in response to the TA anomaly.

The apparatus for processing a TA anomaly may be encompassed in a network device. The network device includes, but is not limited to, an AMF.

In some examples, the recording module 110 and the triggering module 120 may be program modules. After being executed by a processor, the program modules may record, in response to determining the TA anomaly that the UE is located outside the RA of the UE.

In some examples, the recording module 110 and the triggering module 120 may be hardware-software combined modules. The hardware-software combined modules include, but are not limited to, various programmable arrays. The programmable arrays include, but are not limited to, field programmable arrays and complex programmable arrays.

In some other examples, the recording module 110 and the triggering module 120 may be pure hardware modules. The pure hardware modules include, but are not limited to, application-specific integrated circuits.

In some examples, the apparatus further includes a first determination module configured to determine whether the TA anomaly exists when the UE is paged.

In some examples, the apparatus further includes a paging module configured to page the UE after the RA update of the UE is completed.

In some examples, the apparatus further includes a reception module, a second determination module, and a third determination module. The reception module configured to receive a non-access stratum (NAS) request message, where the NAS request message encompasses information indicating the TA where the UE is currently positioned. The second determination module configured to determine whether the TA where the UE is currently positioned is located outside the RA of the UE according to the NAS request message. The third determination module configured to determine that the TA anomaly occurs in response to determining that the TA where the UE is currently positioned is located outside the RA.

In some examples, the apparatus further includes a removal module configured to receive a registration update request initiated by the UE in response to a record of the TA anomaly existing and remove a record of the TA anomaly after the RA update corresponding to the registration update request is completed.

In some examples, the registration update request includes the registration update request is initiated when the UE receives the triggering of the TA anomaly. Alternatively, a registration update request triggered by location movement of the UE, and alternatively, a periodic registration update request is initiated by the UE.

In some examples, the network device includes an access management function (AMF).

Figure 12:
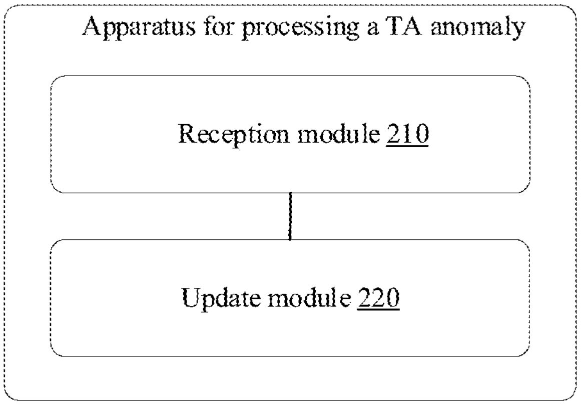
FIG. 12 is a schematic structural diagram of an apparatus for processing a TA anomaly, shown according to an example.

As shown in FIG. 12, an apparatus for processing a TA anomaly is provided in an example of the disclosure. The apparatus is executed by the UE and includes a reception module 210 and an update module 220.

The reception module 210 is configured to receive a triggering indication sent by a network side based on a TA anomaly of the UE.

The update module 220 is configured to perform an RA update according to the triggering indication.

In some examples, the TA anomaly here includes: a condition that a TA, where the UE is currently positioned, is located outside an RA of the UE. The TA anomaly is determined by the network side.

The UE may be of various types, for example, including, but not limited to, a mobile phone, a tablet computer, a wearable device, a vehicle-mounted device, a robot capable of walking on the ground, or an aircraft flying at a low altitude.

In some examples, the reception module 210 and the update module 220 may be program modules. After being executed by a processor, the program modules are capable of receiving a triggering indication issued by the network side and performing the RA update based on the triggering indication.

In some other examples, the reception module 210 and the update module 220 may be hardware-software combined modules. The hardware-software combined modules include, but are not limited to, various programmable arrays. The programmable arrays include, but are not limited to, field programmable arrays and complex programmable arrays.

In some examples, the reception module 210 and the update module 220 may be pure hardware modules. The pure hardware modules include, but are not limited to, application-specific integrated circuits.

In some examples, the apparatus further includes a message module configured to send a NAS request message, where the NAS request message, after being added with location information of the UE at the time of passing through an access network device, is configured for a core network to determine whether the TA anomaly of the UE occurs.

In some examples, the triggering indication is received before the UE is paged.

In an example, the triggering indication may encompass the indication information of the TA anomaly. The indication information is configured to indicate a cause to trigger the UE to initiate a registration update procedure.

A communication device is provided in an example of the disclosure. The communication device includes a memory configured to store a processor-executable instruction and processors connected to the memory separately, where the processor is configured to execute the method for processing a TA anomaly according to any of the foregoing technical solutions.

The memory may include various types of storage media. The storage media are non-transitory computer storage media that can continue to remember information stored after the communication device is powered off.

The communication device includes a UE and a core network device.

The processor may be connected to the memory through a bus, etc., and configured to read an executable program stored in the memory, for example, at least one of the methods shown in FIGS. 2 and 5-10.

Figure 13:
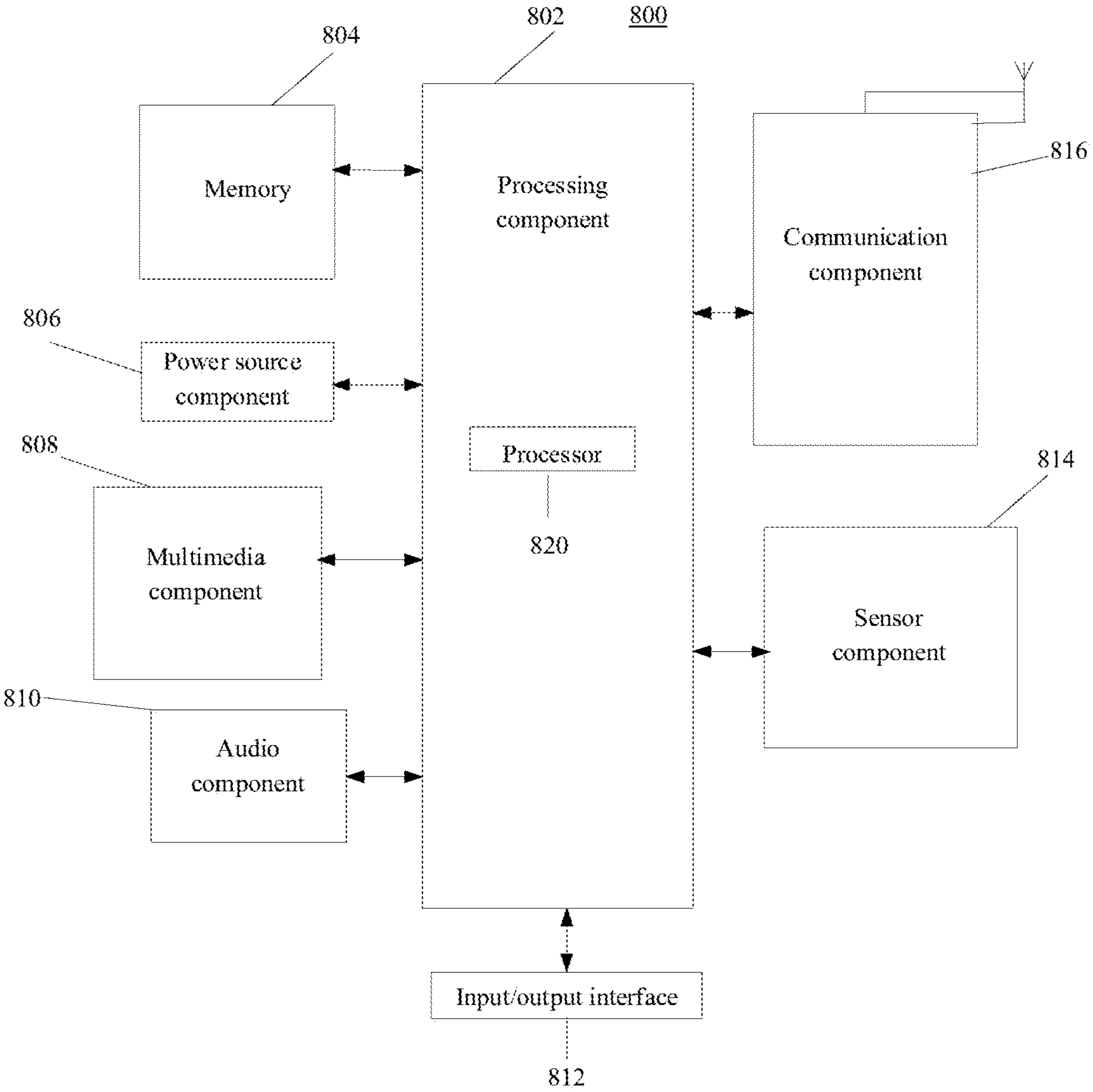
FIG. 13 is a schematic structural diagram of user equipment (UE), shown according to an example.

FIG. 13 is a block diagram of user equipment (UE) 800 shown according to an example. For example, the UE 800 may be a mobile phone, a computer, digital broadcast user equipment, a message transceiving device, a gaming console, a tablet device, a medical device, a fitness device, a personal digital assistant, etc.

With reference to FIG. 13, the UE 800 may include one or more of the following components: a processing component 802, a memory 804, a power source component 806, a multimedia component 808, an audio component 810, an input/output (I/O) interface 812, a sensor component 814, and a communication component 816.

Typically, the processing component 802 controls an overall operation of the UE 800, such as operations associated with display, telephone calls, data communication, a camera operation, and a recording operation. The processing component 802 may include one or more processors 820 to execute instructions, so as to complete all or some of the steps of the above method. In addition, the processing component 802 may include one or more modules, so as to facilitate interaction between the processing component 802 and other components. For example, the processing component 802 may include a multimedia module, so as to facilitate interaction between the multimedia component 808 and the processing component 802.

The memory 804 is configured to store various types of data, so as to support the operations at the UE 800. Examples of these data include instructions of any application or method operated on the UE 800, contact data, phonebook data, messages, pictures, videos, etc. The memory 804 may be implemented through any type of volatile or non-volatile storage devices or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power source component 806 provides power for various components of the UE 800. The power source component 806 may include a power source management system, one or more power sources, and other components associated with power generation, management, and distribution for the UE 800.

The multimedia component 808 includes a screen that provides an output interface between the UE 800 and a user. In some examples, the screen may include a liquid crystal display (LCD) and a touch panel (TP). If including the touch panel, the screen may be implemented as a touch screen, so as to receive an input signal from the user. The touch panel includes one or more touch sensors to sense touches, swipes, and gestures on the touch panel. Except for sensing a boundary of a touch or swipe action, the touch sensor may also measure duration and pressure associated with a touch or swipe operation. In some examples, the multimedia component 808 includes a front-facing camera and/or a rear-facing camera. When the UE 800 is in an operation mode, such as a photographing mode or a video mode, the front-facing camera and/or the rear-facing camera may receive external multimedia data. Each of the front-facing and rear-facing cameras may be a fixed optical lens system or have a focal length and an optical zoom capacity.

The audio component 810 is configured to output and/or input audio signals. For example, the audio component 810 includes a microphone (MIC) that is configured to receive external audio signals when the UE 800 is in an operating mode, such as a call mode, a recording mode, and a voice recognition mode. The audio signals received may be further stored in the memory 804 or sent via the communication component 816. In some examples, the audio component 810 further includes a speaker configured to output the audio signals.

The I/O interface 812 provides an interface between the processing component 802 and a peripheral interface module. The peripheral interface module above may be a keyboard, a click wheel, a button, etc. These buttons may include, but are not limited to, a home button, a volume button, a start button, and a lock button.

The sensor component 814 includes one or more sensors configured to provide state assessments of various aspects of the UE 800. For example, the sensor component 814 may detect an on/off state of the UE 800 and the relative location of the components. For example, the components are a display and a keypad of the UE 800. The sensor component 814 may also detect a change in location of the UE 800 or one component of the UE 800, presence or absence of contact between the user and the UE 800, orientation or acceleration/deceleration of the UE 800, and a change in temperature of the UE 800. The sensor component 814 may include a proximity sensor configured to detect the presence of a nearby object in the absence of any physical contact. The sensor component 814 may further include light sensors, such as a complementary metal-oxide-semiconductor transistor (CMOS) or a charge-coupled device (CCD) image sensor configured to be used in an imaging application. In some examples, the sensor component 814 may further include an acceleration sensor, a gyroscopic sensor, a magnetic sensor, a pressure sensor, or a temperature sensor.

The communication component 816 is configured to facilitate wired or wireless communication between the UE 800 and other devices. The UE 800 may access a radio network based on a communication standard, for example, wireless fidelity (WiFi), 2G, or 3G, or a combination of them. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology, etc.

In the example, the UE 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements configured to execute the method above.

A non-transitory computer-readable storage medium including an instruction, such as a memory 804 including an instruction, is further provided in an example, where the instruction above may be executed by the processor 820 of the UE 800, so as to complete the method above. For example, the non-transitory computer-readable storage medium may be a ROM, a random access memory (RAM), a compact disk read-only memory (CD-ROM), a magnetic tape, a floppy disc, an optical data storage device, etc.

Figure 14:
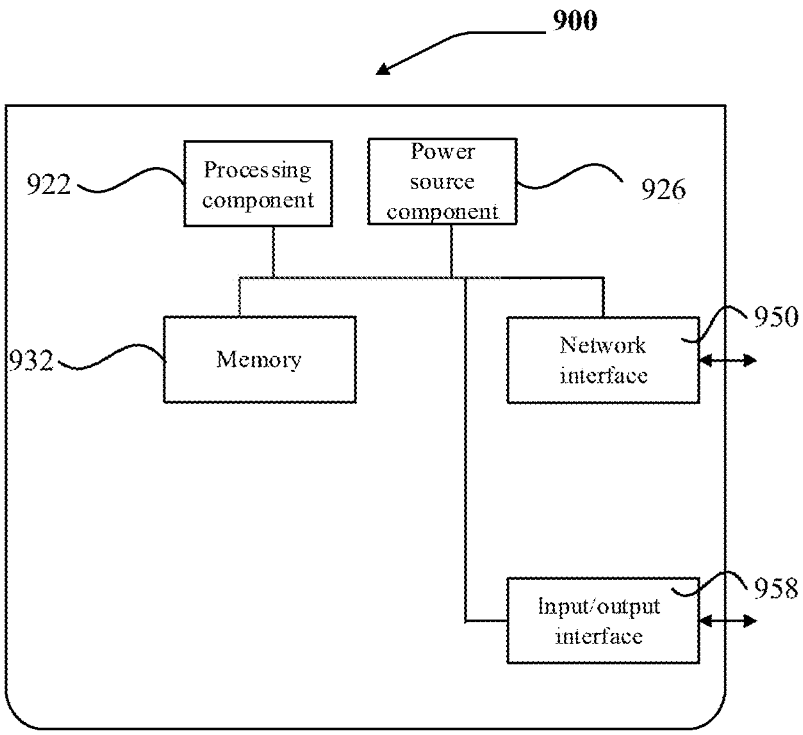
FIG. 14 is a schematic structural diagram of a network device, shown according to an example.

As shown in FIG. 14, a structure of an access device is shown according to an example of the disclosure. For example, a network device 900 may be provided as a network-side device. The network device includes, but is not limited to, a core network device.

With reference to FIG. 14, the network device 900 includes a processing component 922, and further includes one or more processors and memory resources represented by a memory 932 and configured to store an instruction executable by the processing component 922, for example, an application. The application stored in the memory 932 may include one or more modules, each of which corresponds to a set of instructions. In addition, the processing component 922 is configured to execute an instruction, so as to execute any one of the methods above applied to the network device, for example, the methods shown in FIGS. 2 and 5-10.

The network device 900 may further include a power source component 926 configured to execute power source management of the network device 900, a wired or wireless network interface 950 configured to connect the network device 900 to a network, and an input/output (I/O) interface 958. The network device 900 may operate based on an operating system stored in the memory 932, such as Windows Server™, Mac OS X™, Unix™, Linux™, FreeBSD™, etc.

Other embodiments of the disclosure will readily occur to those skilled in the art upon consideration of the description and practice of the invention disclosed here. The disclosure is intended to cover any variations, uses, or adaptive changes of the disclosure that follow the general principles of the disclosure and include common general knowledge or customary technical means in the art not disclosed in the disclosure. The description and the examples are merely deemed illustrative, and the true scope and spirit of the disclosure are indicated by the following claims.

It should be understood that the disclosure is not limited to the precise structure that has been described above and shown in the accompanying drawings, and that various modifications and changes can be made without departing from the scope of the disclosure. The scope of the disclosure is merely limited by the appended claims.

In a first aspect, a method for processing a TA anomaly is provided in an example of the disclosure. The method is executed by a network device and includes: recording, in response to determining that the TA anomaly that a TA where UE is currently positioned is located outside a registration area (RA) of the UE occurs, the TA anomaly, and triggering an RA update of the UE in response to the TA anomaly.

In an embodiment, further including determining whether the TA anomaly exists when paging the UE.

In an embodiment, further including paging the UE after the RA update of the UE is completed.

In an embodiment, the method further includes: receiving a non-access stratum (NAS) request message, where the NAS request message encompasses information of the TA where the UE is currently positioned; determining whether the TA where the UE is currently positioned is located outside the RA of the UE according to the NAS request message; and determining that the TA anomaly occurs in response to determining that the TA where the UE is currently positioned is located outside the RA.

In an embodiment, the method further includes receiving a registration update request initiated by the UE in response to a record of the TA anomaly existing; and removing a record of the TA anomaly after the RA update corresponding to the registration update request is completed.

In an embodiment, the registration update request includes the registration update request is initiated when the UE receives the triggering of the TA anomaly, or a registration update request triggered by location movement of the UE, or a periodic registration update request initiated by the UE.

In an embodiment, the network device includes an access management function (AMF).

In a second aspect, a method for processing a TA anomaly is provided in an example of the disclosure. The method is executed by a user equipment (UE) and includes: receiving a triggering indication sent by a network side based on the TA anomaly of the UE, where the TA anomaly includes: a TA where the UE is currently positioned is located outside an RA of the UE; and performing an RA update according to the triggering indication.

In an embodiment, the method further includes sending a NAS request message, where the NAS request message, after being added with the location information of the UE at the time of passing through an access network device, is configured for the core network to determine whether the TA anomaly of the UE occurs.

In a third aspect, an apparatus for processing a TA anomaly is provided in an example of the disclosure. The apparatus includes: a recording module configured to record, in response to determining that the TA anomaly that a TA where UE is currently positioned is located outside an RA of the UE occurs, the TA anomaly; and a triggering module configured to trigger an RA update of the UE in response to the TA anomaly.

In an embodiment, the apparatus further includes a first determination module configured to determine whether the TA anomaly exists when paging the UE.

In an embodiment, the apparatus further includes a paging module configured to page the UE after the RA update of the UE is completed.

In an embodiment, the apparatus further includes: a reception module configured to receive a non-access stratum (NAS) request message, where the NAS request message encompasses information of the TA where the UE is currently positioned; a second determination module configured to determine whether the TA where the UE is currently positioned is located outside the RA of the UE according to the NAS request message; and a third determination module configured to determine that the TA anomaly occurs in response to determining that the TA where the UE is currently positioned is located outside the RA.

In an embodiment, the apparatus further includes a removal module configured to receive a registration update request initiated by the UE in response to a record of the TA anomaly existing and remove a record of the TA anomaly after the RA update corresponding to the registration update request is completed.

In an embodiment, the registration update request includes the registration update request is initiated when the UE receives the triggering of the TA anomaly, a registration update request triggered by location movement of the UE, or a periodic registration update request initiated by the UE.

In an embodiment, the network device includes an access management function (AMF).

In a fourth aspect, an apparatus for processing a TA anomaly is provided in an example of the disclosure. The apparatus includes: a reception module configured to receive a triggering indication sent by a network side based on the TA anomaly of the UE, where the TA anomaly includes: a TA where the UE is currently positioned is located outside an RA of the UE; and an update module configured to perform an RA update according to the triggering indication.

In an embodiment, the apparatus further includes a message module configured to send a NAS request message, where the NAS request message, after being added with location information of the UE at the time of passing through an access network device, is configured for a core network to determine whether the TA anomaly of the UE occurs.

In a fifth aspect, a communication device is provided in an example of the disclosure. The communication device includes a processor, a transceiver, a memory, and an executable program stored in the memory and runnable by the processor, where the processor executes the method for processing a TA anomaly in the first foregoing aspect when running the executable program.

In a sixth aspect, a computer storage medium is provided in an example of the disclosure. The computer storage medium stores an executable instruction, where the executable instruction implements the method for processing a TA anomaly in the first foregoing aspect when executed by a processor.

In the technical solutions according to the examples of the disclosure, after being found, the TA anomaly of the UE is recorded, and the network side actively triggers the UE to perform the RA update based on the TA anomaly. Accordingly, the TA anomaly is removed, so that abnormalities associated with the TA where the UE is positioned, such as a paging failure caused by the TA anomaly, are suppressed.

The invention claimed is:

1. A method for processing a tracking area (TA) anomaly, executed by a network device and comprising:

receiving a non-access stratum (NAS) request message, wherein the NAS request message encompasses information of the TA where user equipment (UE) is currently positioned;

determining whether the TA where the UE is currently positioned is located outside a registration area (RA) of the UE according to the NAS request message;

determining that a TA anomaly occurs in response to determining that the TA where the UE is currently positioned is located outside the RA;

neglecting, in response to determining that the TA anomaly that the TA where the UE is currently positioned is located outside the RA of the UE occurs, the TA anomaly, and continuing performing a NAS flow of the NAS request message;

recording the TA anomaly and forming state information of a TA anomaly state;

determining, based on the state information of the TA anomaly state, whether the TA anomaly exists when paging the UE;

triggering an RA update of the UE in response to the TA anomaly; and paging the UE after the RA update of the UE is completed, wherein the method further comprises:

receiving a registration update request initiated by the UE in response to a record of the TA anomaly existing;

monitoring an execution of a registration flow corresponding to the registration update request; and removing the record of the TA anomaly after the RA update corresponding to the registration update request is completed, and wherein the registration update request comprises:

the registration update request initiated in a case where the UE receives the triggering of the TA anomaly;

a registration update request triggered by location movement of the UE; or a periodic registration update request initiated by the UE.

2. The method according to claim 1, wherein the network device comprises an access management function (AMF).

3. A method for processing a tracking area (TA) anomaly, executed by user equipment (UE) and comprising:

sending a non-access stratum (NAS) request message, wherein the NAS request message, after being added with location information of the UE at a time of passing through an access network device, is configured for a core network to determine whether the TA anomaly of the UE occurs;

receiving a triggering indication sent by a network side based on the TA anomaly of the UE, wherein the TA anomaly comprises:

a TA where the UE is currently positioned is located outside a registration area (RA) of the UE, and the triggering indication is sent by the network side when it determines to page the UE and determines, based on state information of a TA anomaly state, that the UE to be paged has the TA anomaly; and performing an RA update according to the triggering indication, wherein the network side pages the UE after the RA update is completed, the state information is recorded by the network side when it determines, based on the NAS request message, that the TA anomaly that the TA where the UE is currently positioned is located outside the RA of the UE occurs, wherein the core network, when determining that the TA anomaly occurs, neglects the TA anomaly and continues performing a NAS flow triggered by the NAS request message, and a record of the TA anomaly is removed after the core network receives a registration update request initiated by the UE and completes the RA update corresponding to the registration update request, and wherein the registration update request comprises:

the registration update request initiated in a case where the UE receives the triggering indication of the TA anomaly, a registration update request triggered by location movement of the UE, or a periodic registration update request initiated by the UE.

4. A communication device, comprising:

one or more processors;

a transceiver;

a memory; and an executable program stored in the memory and runnable by the one or more processors, wherein the one or more processors are collectively configured to:

receive a non-access stratum (NAS) request message, wherein the NAS request message encompasses information of a tracking area (TA) where user equipment (UE) is currently positioned, determine whether the TA where the UE is currently positioned is located outside a registration area (RA) of the UE according to the NAS request message, determine that a TA anomaly occurs in response to determining that the TA where the UE is currently positioned is located outside the RA, neglect, in response to determining that the TA anomaly that the TA where the UE is currently positioned is located outside the (RA) of the UE occurs, the TA anomaly, and continue performing a NAS flow of the NAS request message, record the TA anomaly and forming state information of a TA anomaly state, determine, based on the state information of the TA anomaly state, whether the TA anomaly exists when paging the UE, trigger an RA update of the UE in response to the TA anomaly, and page the UE after the RA update of the UE is completed, wherein the one or more processors are further collectively configured to:

receive a registration update request initiated by the UE in response to a record of the TA anomaly existing, monitor an execution of a registration flow corresponding to the registration update request, and remove the record of the TA anomaly after the RA update corresponding to the registration update request is completed, and wherein the registration update request comprises:

the registration update request initiated in a case where the UE receives the trigger of the TA anomaly, a registration update request triggered by location movement of the UE, or a periodic registration update request initiated by the UE.

5. A communication device, comprising:

one or more processors;

a transceiver;

a memory; and an executable program stored in the memory and runnable by the one or more processors, and wherein the one or more processors execute the method according to claim 3 when running the executable program.

6. The method according to claim 1, wherein triggering the RA update of the UE in response to the TA anomaly comprises:

determining whether the TA anomaly exists periodically; and triggering to perform the RA update based on an existing TA anomaly in response to the TA anomaly existing.

7. The method according to claim 1, wherein triggering an RA update of the UE in response to the TA anomaly comprises:

determining whether the TA anomaly exists, before a service flow or a control flow associated with the RA of the UE or the TA where the UE is positioned is executed; and triggering to perform the RA update based on an existing TA anomaly in response to the TA anomaly existing.

8. The method according to claim 1, further comprising: responding the NAS request message in a case where the TA anomaly is determined.

9. The communication device according to claim 4, wherein the one or more processors are further collectively configured to:

send a triggering indication to the UE based on the TA anomaly of the UE, and wherein the TA anomaly comprises the TA where the UE is currently positioned is located outside the RA of the UE.

10. The method according to claim 1, wherein the registration update request comprises a registration update request initiated by the UE based on triggering by the network device.

11. The method according to claim 1, wherein the NAS request message comprises at least one of:

a protocol data unit (PDU) session establishment request message, or a service request message.

12. The method according to claim 1, wherein the NAS request message carries user location information (ULI), and the ULI comprises location information of the TA where the UE is positioned.

13. The method according to claim 3, wherein the registration update request comprises a registration update request initiated by the UE based on triggering by the access network device.

14. The method according to claim 3, wherein the NAS request message comprises at least one of:

a protocol data unit (PDU) session establishment request message, or a service request message.

15. The method according to claim 3, wherein the NAS request message carries user location information (ULI), and the ULI comprises location information of the TA where the UE is positioned.

16. The communication device according to claim 4, wherein the registration update request comprises a registration update request initiated by the UE based on triggering by the one or more processors.

17. The communication device according to claim 4, wherein the NAS request message comprises at least one of:

a protocol data unit (PDU) session establishment request message, or a service request message.

18. The communication device according to claim 4, wherein the NAS request message carries user location information (ULI), and the ULI comprises location information of the TA where the UE is positioned.

* * * * *